US011868389B2

(12) United States Patent
Sun et al.

(10) Patent No.: US 11,868,389 B2
(45) Date of Patent: Jan. 9, 2024

(54) SEARCH METHOD AND APPARATUS, AND ELECTRONIC DEVICE AND STORAGE MEDIUM

(71) Applicant: BEIJING BYTEDANCE NETWORK TECHNOLOGY CO., LTD., Beijing (CN)

(72) Inventors: Shu Sun, Beijing (CN); Xuan Zhao, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/884,914

(22) Filed: Aug. 10, 2022

(65) Prior Publication Data
US 2022/0382797 A1 Dec. 1, 2022

Related U.S. Application Data

(63) Continuation of application No. PCT/CN2021/109324, filed on Jul. 29, 2021.

(30) Foreign Application Priority Data

Aug. 10, 2020 (CN) .......................... 202010794468.8

(51) Int. Cl.
*G06F 16/43* (2019.01)
*G06F 16/432* (2019.01)
(Continued)

(52) U.S. Cl.
CPC .............. *G06F 16/432* (2019.01); *G06F 3/14* (2013.01); *G06F 16/483* (2019.01)

(58) Field of Classification Search
None
See application file for complete search history.

(56) References Cited

U.S. PATENT DOCUMENTS 5,761,652 A * 6/1998 Wu ...................... G06F 16/2264
707/999.102
6,134,541 A * 10/2000 Castelli ............. G06F 18/24137
(Continued)

FOREIGN PATENT DOCUMENTS

CN    103279473 A    9/2013
CN    103339597 A    10/2013
(Continued)

OTHER PUBLICATIONS

Examination Report dated May 8, 2023 in Indian Patent Application No. 202227045875, with English translation (6 pages).
(Continued)

*Primary Examiner* — Eliyah S. Harper

(57) ABSTRACT

Provided are a search method and apparatus, and an electronic device and a storage medium. The method comprises: receiving a generic query search request, the generic query search request carrying a generic query term; acquiring at least one multimedia content card corresponding to the generic query term, wherein each multimedia content card corresponds to an extension tag corresponding to the generic query search request, each multimedia content card comprises information of a plurality of multimedia content sets; and presenting information of the plurality of multimedia content sets comprised in each multimedia content card of the at least one multimedia content card. Search results related to a generic query term can be clustered from various dimensions and presented, such that a user can directly find content related to a search intention of the user, thereby improving the search efficiency and shortening a search path.

18 Claims, 10 Drawing Sheets

(51) Int. Cl.
  *G06F 16/483* (2019.01)
  *G06F 3/14* (2006.01)

(56) References Cited

U.S. PATENT DOCUMENTS

| | | | | |
|---|---|---|---|---|
| 7,599,916 B2* | 10/2009 | Weare | ................ | G06F 16/9535 |
| | | | | 707/999.005 |
| 8,234,275 B2* | 7/2012 | Grant | ................ | G06Q 30/0277 |
| | | | | 707/735 |
| 10,135,936 B1* | 11/2018 | Venuraju | ............. | G06F 11/3414 |
| 10,339,150 B1* | 7/2019 | Silk | ................ | G06F 16/24578 |
| 10,762,140 B2* | 9/2020 | Krasadakis | ......... | G06F 16/3322 |
| 10,796,355 B1* | 10/2020 | Price | ................ | G06F 16/9535 |
| 2006/0242135 A1* | 10/2006 | Weare | ................ | G06F 16/9535 |
| 2007/0011154 A1* | 1/2007 | Musgrove | ................ | G06F 40/30 |
| | | | | 707/999.005 |
| 2009/0012944 A1* | 1/2009 | Rodriguez | ......... | G06F 16/5866 |
| 2010/0257193 A1* | 10/2010 | Krupka | ............... | G06F 16/3338 |
| | | | | 707/E17.108 |
| 2010/0274667 A1* | 10/2010 | Lanham | ............. | G06Q 30/0251 |
| | | | | 707/E17.103 |
| 2010/0281364 A1* | 11/2010 | Sidman | ................ | G06Q 30/02 |
| | | | | 715/713 |
| 2011/0208822 A1* | 8/2011 | Rathod | ................ | G06Q 30/02 |
| | | | | 709/206 |
| 2013/0279740 A1* | 10/2013 | Bauer | ................ | G06F 16/23 |
| | | | | 382/100 |
| 2013/0311872 A1* | 11/2013 | Jokl, III | ................ | G06F 40/10 |
| | | | | 715/234 |
| 2013/0325870 A1* | 12/2013 | Rouse | ................ | G06F 16/41 |
| | | | | 707/741 |
| 2014/0064694 A1* | 3/2014 | Zealer | ................ | H04N 5/76 |
| | | | | 386/230 |
| 2015/0294011 A1* | 10/2015 | Tang | ................ | G06F 16/972 |
| | | | | 707/722 |
| 2015/0363484 A1* | 12/2015 | Kamath | ................ | G06F 16/907 |
| | | | | 707/751 |
| 2016/0037227 A1 | 2/2016 | Benn | | |
| 2017/0011029 A1 | 1/2017 | Chatterjee et al. | | |
| 2017/0124447 A1* | 5/2017 | Chang | ................ | G06F 16/951 |
| 2019/0286683 A1 | 9/2019 | Kittur et al. | | |
| 2019/0324987 A1* | 10/2019 | Kamath | ................ | G06F 16/907 |
| 2020/0034347 A1* | 1/2020 | Selly | ................ | G06F 17/16 |
| 2020/0074219 A1* | 3/2020 | Zheng | ................ | G06V 10/7715 |
| 2020/0099988 A1* | 3/2020 | Liu | ................ | H04N 21/25883 |
| 2021/0174164 A1* | 6/2021 | Hsieh | ................ | G06Q 30/0282 |

FOREIGN PATENT DOCUMENTS

| | | |
|---|---|---|
| CN | 103699619 A | 4/2014 |
| CN | 104035957 A | 9/2014 |
| CN | 105404680 A | 3/2016 |
| CN | 105512178 A | 4/2016 |
| CN | 105787102 A | 7/2016 |
| CN | 106599278 A | 4/2017 |
| CN | 109564571 A | 4/2019 |
| CN | 110446063 A | 11/2019 |
| CN | 111241401 A | 6/2020 |
| CN | 111949864 A | 11/2020 |
| WO | 2018131132 A1 | 7/2018 |

OTHER PUBLICATIONS

Search Report dated Oct. 21, 2021 in PCT/CN2021/109324, English translation (3 pages).
Business Record for Social ASCII Media Works, First Edition, Japan, Inc., Co., Ltd., Dec. 10, 2010, with partial English Abstract (6 pages).

* cited by examiner

SEARCH METHOD AND APPARATUS, AND ELECTRONIC DEVICE AND STORAGE MEDIUM

CROSS REFERENCE TO RELATED APPLICATIONS

This application is a continuation of PCT application Ser. No. PCT/CN2021/109324, titled "SEARCH METHOD AND APPARATUS, AND ELECTRONIC DEVICE AND STORAGE MEDIUM", filed on Jul. 29, 2021, which claims the priority of Chinese Patent Application No. 202010794468.8, filed on Aug. 10, 2020, entitled "SEARCH METHOD AND APPARATUS, AND ELECTRONIC DEVICE AND STORAGE MEDIUM", and the entire contents of both of which are incorporated herein by reference.

FIELD

The present disclosure relates to the technical field of Internet, in particular to a search method and device, electronic device and a storage medium.

BACKGROUND

With the rapid development of the Internet technology, the demand of a user on a search function of a search engine is continuously increased. When the user inputs a search word, the search engine will push a recommendation result relevant to the current search word to the user.

The current search engine only takes the degree of correlation between a search result and the search word into account and shows the user the search result of which the content is relatively single and dispersed, and thus, the search efficiency of the user is lower.

SUMMARY

Embodiments of the present disclosure at least provide a search solution in which search results relevant to a search word provided by a user may be clustered and displayed from various search dimensions, and the user may directly find contents relevant to a search intention of the user, so that the search efficiency is increased, and a search path is shortened.

At least includes several aspects below:

In a first aspect, an embodiment of the disclosure provides a search method, wherein the method comprises:

receiving an extensive query search request, the extensive query search request carrying extensive query words;

obtaining at least one multimedia content card corresponding to the extensive query words, wherein each of the multimedia content cards corresponds to an extension tag corresponding to the extensive query search request, each of the multimedia content cards comprises information of a plurality of multimedia content sets, and each of the multimedia content sets corresponds to an extension subtag corresponding to the extension tag; and displaying the information of the plurality of the multimedia content sets included in each of the multimedia content cards in the at least one multimedia content card.

In an implementation, displaying the information of the plurality of the multimedia content sets included in each of the multimedia content cards comprises:

respectively displaying cover images and text description contents of the multimedia content sets included in the multimedia content card on display locations corresponding to the multimedia content card, wherein the cover images and the text description contents are determined based on the multimedia content sets.

In an implementation, the method further comprises:

playing a multimedia content included in the multimedia content set in a form of a multimedia content stream, in response to a triggering operation for any one of the multimedia content sets.

In an implementation, the method further comprises:

continuously playing multimedia contents included in other multimedia content sets in the form of the multimedia content stream, in response to playing completion of the multimedia content included in the multimedia content set, wherein the multimedia content set and the other multimedia content sets belong to a same multimedia content card.

In a second aspect, an embodiment of the disclosure further provides a search method, wherein the method comprises:

obtaining an extensive query search request, the extensive query search request carrying extensive query words;

determining at least one extension tag corresponding to the extensive query search request and a plurality of extension subtags corresponding to each of the extension tags according to the extensive query words;

for each of the extension tags, obtaining multimedia content sets corresponding to the extension subtags, and generating multimedia content cards corresponding to the extension tag according to the multimedia content sets; and obtaining at least one multimedia content card corresponding to the extensive query words based on the multimedia content cards corresponding to the at least one extension tag.

In an implementation, the method further comprises:

sorting the extensive query words into at least two types of extensive query word sets according to attribute information of the extensive query words;

obtaining historical search information relevant to the extensive query words to obtain historical search information of the extensive query word sets; and for each type of extensive query word set, extracting key words in the historical search information of the extensive query word set, and determining at least one extension tag corresponding to the extensive query word set and a plurality of extension subtags corresponding to each of the extension tags according to the key words, wherein the at least one extension tag is generated by clustering the plurality of the extension subtags.

In an implementation, determining at least one extension tag corresponding to the extensive query search request and a plurality of extension subtags corresponding to each of the extension tags according to the extensive query words comprises:

determining the extensive query word sets including the extensive query words; and using at least one extension tag corresponding to the extensive query word sets and the plurality of the extension subtags corresponding to each of the extension tags as the at least one extension tag corresponding to the extensive query search request and the plurality of the extension subtags corresponding to each of the extension tags.

In an implementation, determining at least one extension tag corresponding to the extensive query search request and a plurality of extension subtags corresponding to each of the extension tags according to the extensive query words comprises:

determining extensive query word sets corresponding to the extensive query words based on the attribute information of the extensive query words, in response to determining that the extensive query words do not exist in any one of the extensive query word sets; and using at least one extension tag corresponding to the extensive query word sets and the plurality of the extension subtags corresponding to each of the extension tags as the at least one extension tag corresponding to the extensive query search request and the plurality of the extension subtags corresponding to each of the extension tags.

In an implementation, the method further comprises:

obtaining historical search statements;

analyzing and clustering the historical search statements to obtain candidate words corresponding to the extension tags; and updating the plurality of the extension subtags corresponding to the extension tags based on the candidate words.

In an implementation, multimedia content sets corresponding to each of the extension subtags are determined according to the following steps:

obtaining key words under the extension subtags, wherein the key words are obtained based on historical interaction data analysis; and for each of the extension subtags, searching at least one multimedia content matched with the key words under the extension subtag from a multimedia content library to obtain the multimedia content sets corresponding to each of the extension subtags.

In an implementation, the method further comprises:

for each multimedia content set included in each multimedia content card, extracting at least one key frame image from at least one multimedia content included in the multimedia content set, and searching a key frame image with a maximum matching degree from the at least one key frame image as a cover image of the multimedia content set based on a matching degree between the at least one extracted key frame image and each of the extension subtags corresponding to the multimedia content set.

In an implementation, the method further comprises:

for each multimedia content set included in each multimedia content card, obtaining description information of at least one multimedia content included in the multimedia content set, and searching description information with a maximum matching degree from the at least one piece of description information as a text description content of the multimedia content set based on a matching degree between the at least one piece of obtained description information and each of the extension subtags corresponding to the multimedia content set.

In a third aspect, an embodiment of the disclosure further provides a search device, wherein the device comprises:

a receiving module configured to receive an extensive query search request, the extensive query search request carrying extensive query words;

an obtaining module configured to obtain at least one multimedia content card corresponding to the extensive query words, wherein each of the multimedia content cards corresponds to an extension tag corresponding to the extensive query search request, each of the multimedia content cards comprises information of a plurality of multimedia content sets, and each of the multimedia content sets corresponds to an extension subtag corresponding to the extension tag; and a display module configured to display the information of the plurality of the multimedia content sets included in each of the multimedia content cards in the at least one multimedia content card.

In a fourth aspect, an embodiment of the disclosure further provides a search device, wherein the device comprises:

an obtaining module configured to obtain an extensive query search request, the extensive query search request carrying extensive query words;

a determination module configured to determine at least one extension tag corresponding to the extensive query search request and a plurality of extension subtags corresponding to each of the extension tags according to the extensive query words; and a generation module configured to, for each of the extension tags, obtain multimedia content sets corresponding to the extension subtags, and generate multimedia content cards corresponding to the extension tag according to the multimedia content sets; and obtain at least one multimedia content card corresponding to the extensive query words based on the multimedia content cards corresponding to the at least one extension tag.

In a fifth aspect, an embodiment of the disclosure further provides an electronic device, comprising a processor, a memory and a bus, wherein the memory stores a machine readable instruction that can be executed by the processor, when the electronic device operates, the processor communicates with the memory by the bus, and when the machine readable instruction is executed by the processor, the steps of the search method as described in any one of the first aspect and its various implementations, the second aspect and its various implementations are performed.

In a sixth aspect, an embodiment of the disclosure further provides a computer readable storage medium, wherein a computer program is stored the computer readable storage medium, and when the computer program is executed by a processor, the steps of the search method as described in any one of the first aspect and its various implementations, the second aspect and its various implementations are performed.

By adopting the above-mentioned search solution, after an extensive query search request is received, at least one multimedia content card corresponding to extensive query words carried in the extensive query search request may be obtained, and information of a plurality of multimedia content sets included in each multimedia content card in the at least one multimedia content card is displayed, and each of the multimedia content sets corresponds to an extension subtag in an extension tag corresponding to the extensive query search request. In this way, a user terminal may browse the multimedia content sets included in the multimedia content cards by triggering the displayed multimedia content cards. Since the above-mentioned multimedia content cards correspond to a plurality of extension subtags (corresponding to different search dimensions) corresponding to the extension tags of the extensive query words, search results relevant to the extensive query words may be clustered and displayed from various dimensions, and the user may directly find contents relevant to the search intention of the user, so that the search efficiency is increased, and a search path is shortened.

To make the above-mentioned objectives, features, and advantages of the present disclosure more obvious and comprehensible, the present disclosure is described in detail below with reference to the preferred embodiments in cooperation with the appended accompanying drawings.

BRIEF DESCRIPTION OF THE DRAWINGS

In order to more clearly explain the technical solution of the embodiments of the present disclosure, the drawings that need to be used in the embodiments will be briefly introduced below. The drawings herein are incorporated into the description and form a part of the description. These drawings show the embodiments in line with the present disclosure and are used to explain the technical solution of the present disclosure together with the description. It should be understood that the following drawings only show some embodiments of the present disclosure, so they should not be regarded as limiting the scope. For those skilled in the art, other relevant drawings can be obtained from these drawings without creative work.

FIG. 2 (b1) shows a schematic diagram of an application of the search method provided in Embodiment 1 of the present disclosure;

FIG. 2 (b2) shows a schematic diagram of an application of the search method provided in Embodiment 1 of the present disclosure;

FIG. 2 (b3) shows a schematic diagram of an application of the search method provided in Embodiment 1 of the present disclosure;

FIG. 2 (c) shows a schematic diagram of an application of the search method provided in Embodiment 1 of the present disclosure;

DETAILED DESCRIPTION OF THE EMBODIMENTS

Figure 1:
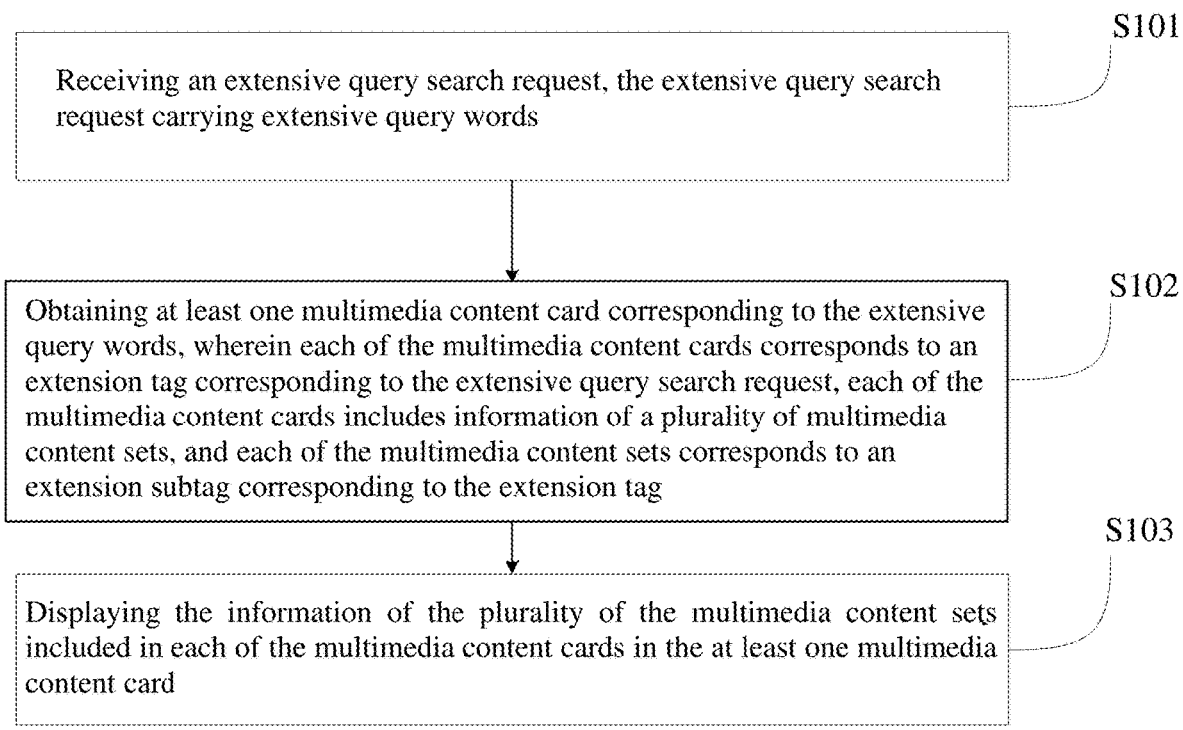
FIG. 1 shows a flow diagram of a search method provided in Embodiment 1 of the present disclosure.

In order to make the purpose, technical solution and advantages of the embodiments of the present disclosure more clear, the technical solution in the embodiments of the present disclosure will be described clearly and completely below in combination with the accompanying drawings in the embodiments of the present disclosure. Obviously, the described embodiments are only part of the embodiments of the present disclosure, not all of them. The components of the embodiments of the present disclosure generally described and shown in the accompanying drawings herein may be arranged and designed in various different configurations. Therefore, the following detailed description of the embodiments of the present disclosure provided in the accompanying drawings is not intended to limit the scope of the claimed disclosure, but merely represents selected embodiments of the present disclosure. Based on the embodiments of the present disclosure, all other embodiments obtained by those skilled in the art without creative work fall within the scope of protection of the present disclosure.

It is found by research that the current search engine only takes the degree of correlation between a search result and a search word into account and shows a user the search result of which the content is relatively single and dispersed.

Based on the above-mentioned research, the present disclosure provides at least one search solution, in which, by clustering multimedia content sets corresponding to different multimedia content cards, search results relevant to a search word provided by a user may be clustered and displayed from various search dimensions, and the user may directly find contents relevant to a search intention of the user, so that the search efficiency is increased, and a search path is shortened.

The defects existing the above-mentioned solution are all the results obtained by the practice and careful research of the inventor, and therefore, the searching processes of the above-mentioned problems and the following solution proposed for the above-mentioned problems should be contributions of the inventor to the present disclosure in the implementation of the present disclosure.

It should be noted that similar reference numerals and letters represent similar items in the following accompanying drawings, and therefore, once a certain item is defined in an accompanying drawing, the item is not needed to be further defined and explained in the subsequent accompanying drawings.

For facilitating understanding this embodiment, firstly, a search method disclosed in the embodiments of the present disclosure is introduced in detail. An executive subject for the search method provided in the embodiments of the present disclosure is generally electronic device with certain computing power, the electronic device includes, for example, terminal equipment or a server or other processing equipment, and the terminal equipment may be UE (User Equipment), mobile equipment, a user terminal, a cellular phone, a cordless telephone, a personal digital assistant (PDA), handheld equipment, computing equipment, vehicle-mounted equipment, wearable equipment and the like. In some possible implementation manners, the search method may be implemented in a manner that a processor calls a computer readable instruction stored in a memory.

The search method provided in the embodiments of the present disclosure will be described below with an example in which the executive subject is the user terminal.

Embodiment 1

With reference to FIG. 1 which shows a flow diagram of a search method provided in Embodiment 1 of the present disclosure, the method includes steps S101 to S103, wherein S101, an extensive query search request is received, the extensive query search request carrying extensive query words.

The search method provided in the embodiment of the present disclosure is query without clear intentions for extensive query words. Here, the extensive query words refer to search words without clear search intentions. For example, when a city name AA is input, a search intention of a user may be multimedia contents relevant to food in this city or multimedia contents relevant to the weather in this city.

In the embodiment of the present disclosure, for facilitating making a response to the extensive query search request of the user, a relevant search button and search box may be disposed on a search page on the user terminal. For example, the above-mentioned search request may be initiated after the search button is triggered in response to an operation of the user triggering the search button on the premise that the user inputs the extensive query words to be searched to the search box. The extensive query words input to the search box may be carried to the above-mentioned search request and transmitted to a server while the search request is initiated. In addition to this, in the embodiment of the present disclosure, other triggering manners may be further adopted to trigger the above-mentioned extensive query search request, which is not specifically limited in the embodiment of the present disclosure.

S102, At least one multimedia content card corresponding to the extensive query words is obtained, wherein each of the multimedia content cards corresponds to an extension tag corresponding to the extensive query search request, each of the multimedia content cards includes information of a plurality of multimedia content sets, and each of the multimedia content sets corresponds to an extension subtag corresponding to the extension tag.

The above-mentioned multimedia content cards may be aggregation cards formed by aggregation based on the multimedia content sets, that is, one multimedia content card indicates a plurality of multimedia content sets. Here, each multimedia content set generally includes a plurality of multimedia contents, the multimedia contents described herein may be images, videos or other medium content forms. In view of the extensive application of video search, most of the following specific descriptions is shown with a video as an example.

In the embodiment of the present disclosure, one multimedia content card may correspond to one extension tag, and the multimedia content sets included in the multimedia content card may respectively correspond to an extension subtag of the extension tag. The extension subtag described herein may be used for describing relevant medium content information of the multimedia content sets. In a specific application, one extension subtag may correspond to a plurality of key words, the extension tag described herein may describe aggregation tag information corresponding to a plurality of extension subtags.

In an actual application, the above-mentioned extension tags and extension subtags may be generated in advanced based on relevant information (such as historical search information) of historical query words, in this way, under the condition that the extensive query words carried in the query search request are obtained, the extension tags matched with the extensive query words and the corresponding extension subtags may be determined from the extension tags and extension subtags generated in advance.

For example, under the condition that the city name AA is used as an extensive query word, the above-mentioned extension tag may be an AA guide, and the several corresponding extension subtags may be an AA travel guide, an AA beautiful scenery guide and an AA food guide.

S103, the information of the plurality of the multimedia content sets included in each multimedia content card in the at least one multimedia content card is displayed.

Here, for facilitating displaying the multimedia content sets, in the embodiments of the present disclosure, one multimedia content card (corresponding to one aggregation card) may be provided with a plurality of display locations, and information of one multimedia content set is displayed on each of the display locations.

During specific implementation, the displayed information of the multimedia content sets may include cover images and text description contents of the multimedia content sets, wherein the cover images and the text description contents may be determined based on the multimedia content sets.

The above-mentioned cover images may be images selected randomly from the multimedia contents included in the multimedia content sets or screened images which are most representative. For example, in a multimedia content set including 5 short videos, a key video frame, such as a video frame including a video title or a video frame with the largest number of frames which repeatedly appears and the like, may be screened from video frames of the 5 short videos, and the screened key video frame is used as a cover image.

In addition, the above-mentioned text description contents may be description information relevant to the multimedia content sets, which is still described herein with a multimedia content set including 5 short videos as an example, such description information may include statistical information relevant to the number of the multimedia contents to be displayed, namely statistical information that one multimedia content set includes 5 short videos; the description information may also be description information determined based on analysis of subject contents of the 5 short videos; in addition, the description information may further include other description information, which is not specifically limited in the embodiment of the present disclosure.

It needs to be noted that the above-mentioned text description contents may be displayed on the cover images or presented alone. For example, the text description contents are presented below the cover images, which is not specifically limited in the embodiments of the present disclosure.

Based on the above-mentioned steps, after the multimedia content cards and the information of the corresponding multimedia content sets are displayed on a search result page, if information of any one of the multimedia content sets is triggered, the multimedia contents included in the multimedia content set may be displayed, and thus, a user may view the multimedia contents relevant to an intention.

Specifically, after the user performs a triggering operation on the cover image of the multimedia content set, the multimedia contents included in the multimedia content set may be played in a form of a multimedia content stream (such as a Feed stream).

Here, by still taking the condition that the city name AA is used as the extensive query word an example, under the condition that the extension tag corresponding to the extensive query word includes an AA guide, and the several corresponding extension subtags include an AA travel guide, an AA beautiful scenery guide and an AA food guide, if the cover image of the multimedia content set corresponding to the AA travel guide serving as an extension subtag is triggered, the multimedia contents included in the multimedia content set may be played; and similarly, under the condition that the cover images of the multimedia content sets corresponding to other extension subtags are triggered, the corresponding multimedia contents may be correspondingly played, and the descriptions thereof are omitted herein.

In addition, in view of certain relevance among the extension subtags belonging to the same extension tag (corresponding to a same multimedia content card), the embodiment of the present disclosure provides a solution for continuous playing from the multimedia content set corresponding to one extension subtag to the multimedia content set corresponding to another extension subtag.

Here, by still taking the condition that the city name AA is used as the extensive query word an example, under the condition that the extension tag corresponding to the extensive query word includes an AA guide, and the several corresponding extension subtags include an AA travel guide, an AA beautiful scenery guide and an AA food guide, if the cover image of the multimedia content set corresponding to the AA travel guide serving as an extension subtag is currently triggered, after the playing of the multimedia contents included in the multimedia content set corresponding to the AA travel guide is completed, the multimedia contents included in the multimedia content set corresponding to the AA beautiful scenery guide serving as an extension subtag may be subsequently played, and after the playing of the multimedia contents included in the multimedia content set corresponding to the AA beautiful scenery guide is completed, the multimedia contents included in the multimedia content set corresponding to the AA food guide serving as an extension subtag may be subsequently played until the playing of all the multimedia contents is completed, so that rapid display of the multimedia content sets in one multimedia content card is achieved, and the browsing time of the user is shortened.

Figure 2A:
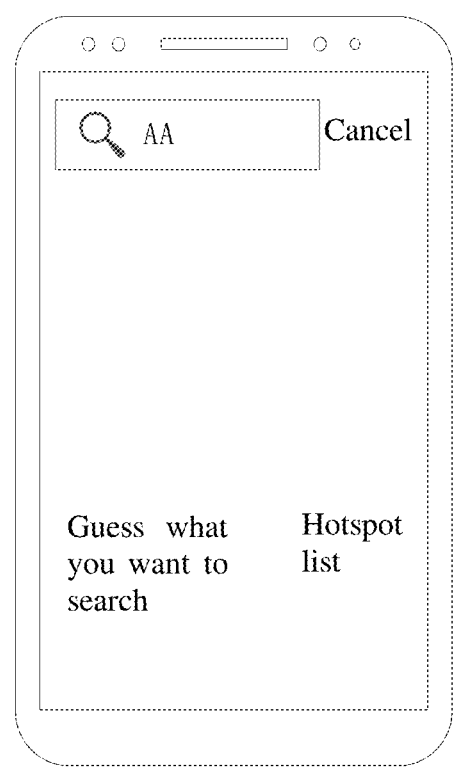
FIG. 2 (a) shows a schematic diagram of an application of the search method provided in Embodiment 1 of the present disclosure.
Figure 2:
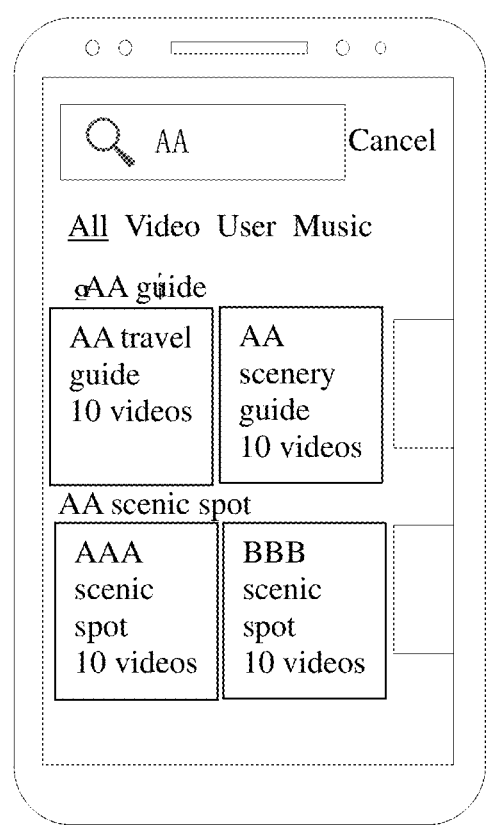
Figure 2:
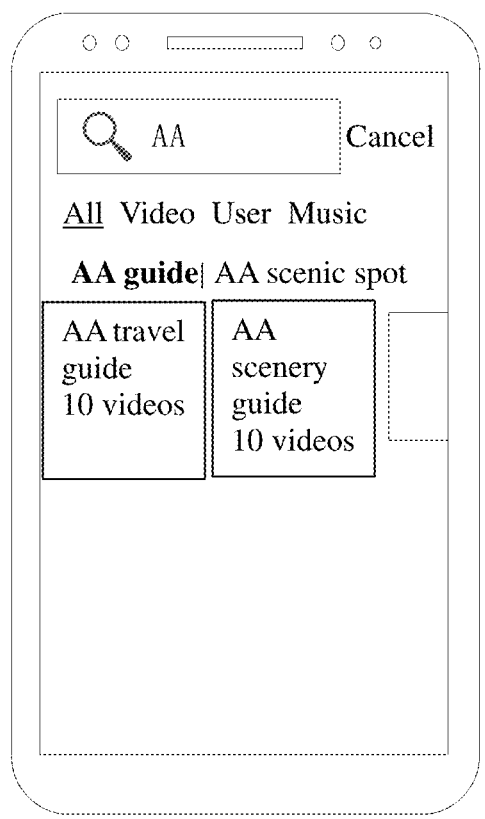
Figure 2:
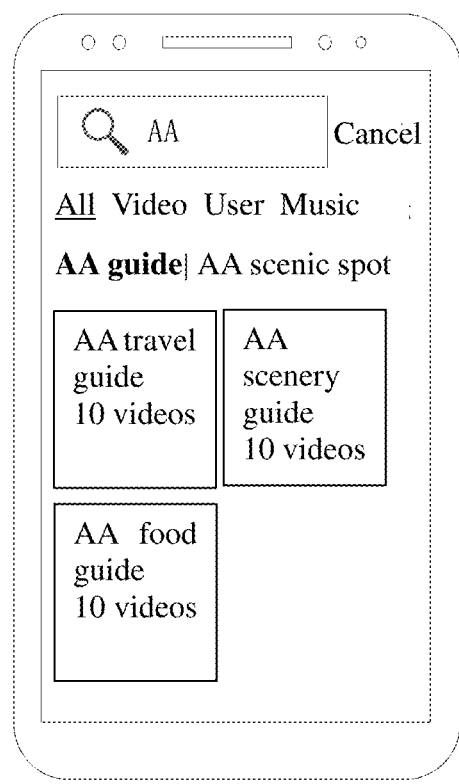
Figure 2C:
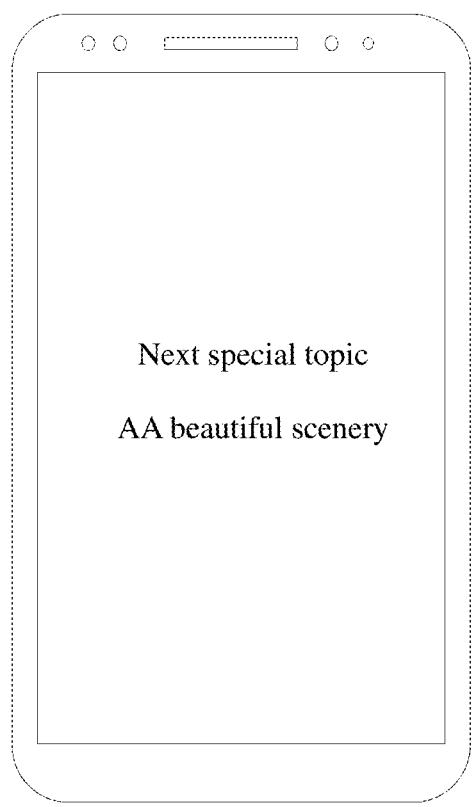

Next, the above-mentioned search method provided in the embodiment of the present disclosure may be exemplarily described with reference to display effect drawings on an interface of a user terminal as shown in FIGS. 2 (*a*) to 2 (*c*).

As shown in FIG. 2 (*a*), a search page presented on the user terminal includes a search box and a search button ( ). After inputting an extensive query word AA and triggering the search button, a user may send an extensive query search request for the extensive query word AA to a server.

The server may determine two extension tags which are respectively an AA guide and an AA scenic spot corresponding to the city AA based on the extensive query word AA serving as a city name in the above-mentioned search request, and each of the AA guide and the AA scenic spot corresponds to one multimedia content card.

When a plurality of multimedia content cards are displayed, a transverse or longitudinal typesetting display manner may be adopted, which is not specifically limited in the embodiment of the present disclosure. In a specific application, the corresponding display manner may be selected with reference to a placement manner of a screen of the user terminal. For example, when the screen of the user terminal is placed vertically, the plurality of the multimedia content cards may be displayed in the longitudinal typesetting display manner.

In the embodiment of the present disclosure, the respective multimedia content cards of the AA guide and the AA scenic spot may be displayed in the longitudinal typesetting display manner, as shown in FIG. 2 (*b*1); the respective multimedia content cards of the AA guide and the AA scenic spot may be further displayed in the transverse typesetting display manner, as shown in FIG. 2 (*b*2); and here, the switching display of the two multimedia content cards may be achieved by triggering the AA guide and the AA scenic spot.

It needs to be noted that the multimedia content cards may be ranked before being displayed, and the front-ranking multimedia content cards may be preferentially displayed. In a specific application, multimedia content cards which are closer to the current search time and of which the contents are higher in quality may be displayed at the front. As shown in FIG. 2 (*b*1) and FIG. 2 (*b*2), the multimedia content card corresponding to the AA guide may be preferentially displayed.

In addition, the server may further determine that the AA guide serving as an extension tag corresponds to three extension subtags: the AA travel guide, the AA beautiful scenery guide and the AA food guide, and the three extension subtags respectively correspond to multimedia content sets relevant to AA city travel, AA city beautiful scenery and AA city food; the AA scenic spot serving as an extension tag may correspond to three extension subtags, an AAA scenic spot, a BBB scenic spot and a CCC scenic spot, wherein the AAA scenic spot, the BBB scenic spot and the CCC scenic spot may respectively correspond to different feature scenic spots corresponding to the AA city, and the three extension subtags respectively correspond to multimedia content sets relevant to the AAA scenic spot, the BBB scenic spot and the CCC scenic spot in the AA city.

Here, each extension subtag may correspond to one multimedia content set. A corresponding cover image may be selected for each multimedia content set, and a text description content may be displayed on the cover image, for example, there are 10 videos in the multimedia content set corresponding to the AAA scenic spot, and correspondingly, a display effect drawing on the interface of the user terminal is as shown in FIG. 2 (*b*1).

In the embodiment of the present disclosure, when a plurality of multimedia content sets are displayed for one multimedia content card, firstly, the multimedia content sets may be ranked, and the front-ranking multimedia content sets may be preferentially displayed. In a specific application, the multimedia content sets which are closer to the current search time and of which the contents are higher in quality may be ranked at the front.

If it is determined by using the above-mentioned ranking method that the ranking order of the multimedia content sets corresponding to the AA travel guide, the AA beautiful scenery guide and the AA food guide is from high to low, at the moment, the cover images and the corresponding text description contents of the plurality of the multimedia content sets may be displayed.

In a specific display process, the transverse typesetting display manner as shown in FIGS. 2 (*b*1) and 2 (*b*2) may be adopted. Due to the limitation of the size of the screen of the user terminal, the cover images and the text description contents thereof corresponding to the AA travel guide and the AA beautiful scenery guide are only displayed, and cover images and text description contents of other multimedia content sets are only partially displayed or not displayed.

In order to avoid the influence of the size of the screen of the user terminal on a display result, the longitudinal typesetting display manner (not shown) may be directly adopted for the plurality of the multimedia content sets included in one multimedia content card in the embodiment of the present disclosure.

In view of the waste of a display space to a certain extent in the longitudinal typesetting display manner and limitation of the size of the screen of the user terminal in the transverse typesetting display manner, in a specific application, the plurality of the multimedia content sets may be displayed in a mixed typesetting display manner with reference to the size of the screen of the user terminal in the embodiment of the present disclosure, as shown in FIG. 2 (*b*3), it can be known that the mixed typesetting display manner makes the utilization of the overall display space maximized on the premise of eliminating the limitation of the size of the screen of the user terminal.

Under the condition that the cover images respectively corresponding to the AA travel guide and the AA beautiful scenery guide are firstly displayed in the manner as shown in FIG. 2 (b1) or FIG. 2 (b2), the displayed contents may be updated by a left-right sliding operation, and thus, the cover images and the text description contents of other multimedia content sets are displayed. For example, by leftward sliding, the cover image and the text description content corresponding to the AA food guide are displayed, and the cover image and the text description content of the AA travel guide are removed out of the display range of the screen.

The above-mentioned text description contents may include the contents (such as the AA travel guide) of the extension subtags and may further include other description information such as the above-mentioned statistical information (namely 10 videos).

In a specific application, one multimedia content card may correspond to one video inner streaming page, in this way, after the playing of all videos of one multimedia content set (corresponding to a special topic) included in one multimedia content card is completed, a next special topic may be automatically entered by a sliding operation of the user.

For example, after the playing of the multimedia content corresponding to the multimedia content set corresponding to the extension subtag indicated by the AA travel guide is completed, at least one multimedia content corresponding to a next multimedia content set indicated by the AA beautiful scenery guide may be entered in response to a triggering operation for a current display page, as shown in FIG. 2 (c).

Next, the search method provided in the embodiment of the present disclosure is further described at a server side.

Embodiment 2

Figure 3:
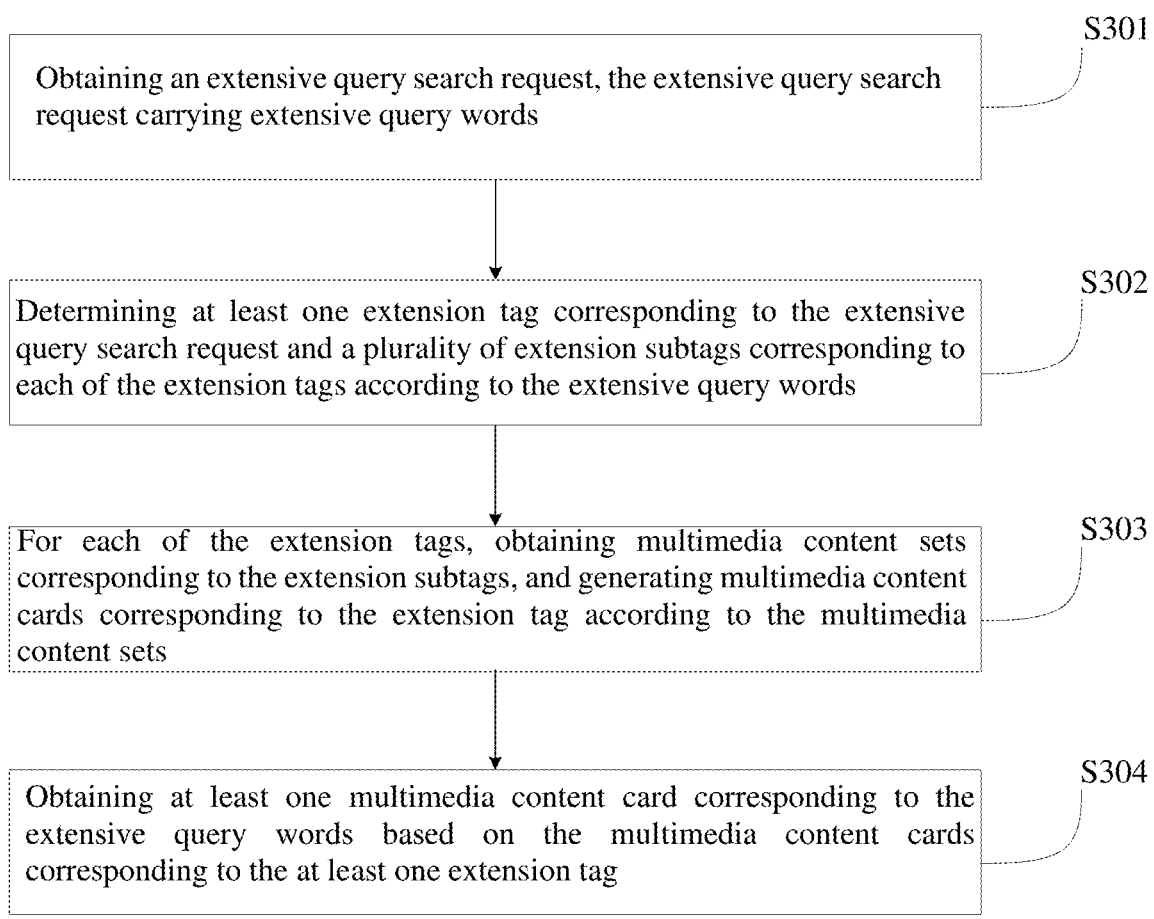
FIG. 3 shows a flow diagram of a search method provided in Embodiment 2 of the present disclosure.

With reference to FIG. 3 which is a flow diagram of a search method provided in Embodiment 2 of the present disclosure, the method includes steps S301 to S304, wherein:

S301, an extensive query search request is obtained, the extensive query search request carrying extensive query words;

S302, at least one extension tag corresponding to the extensive query search request and a plurality of extension subtags corresponding to each of the extension tags are determined according to the extensive query words;

S303, for each of the extension tags, multimedia content sets corresponding to the extension subtags are obtained, and multimedia content cards corresponding to the extension tag are generated according to the multimedia content sets; and S304, at least one multimedia content card corresponding to the extensive query words is obtained based on the multimedia content cards corresponding to the at least one the extension tag.

In the above-mentioned steps, the relevant descriptions of the extensive query search request and the extensive query words refer to the relevant descriptions in Embodiment 1 of the present disclosure, which are omitted herein.

In order to more rapidly make a response to a query request of a user, extension tags corresponding to various extensive query words and extension subtags corresponding to the extension tags may be determined in advance in the embodiment of the present disclosure. Specifically, there are the following two manners:

first: the extensive query words are clustered, and an extension tag of each type corresponding extensive query word set and extension subtags thereof are determined.

Specifically, the extensive query words may be clustered in advance based on attribute information of the extensive query words to obtain various types of extensive query word sets, and then, an extension tag applicable to such type of extensive query word set and extension subtags corresponding to the extension tag are concluded for each type of extensive query word set.

Figure 4:
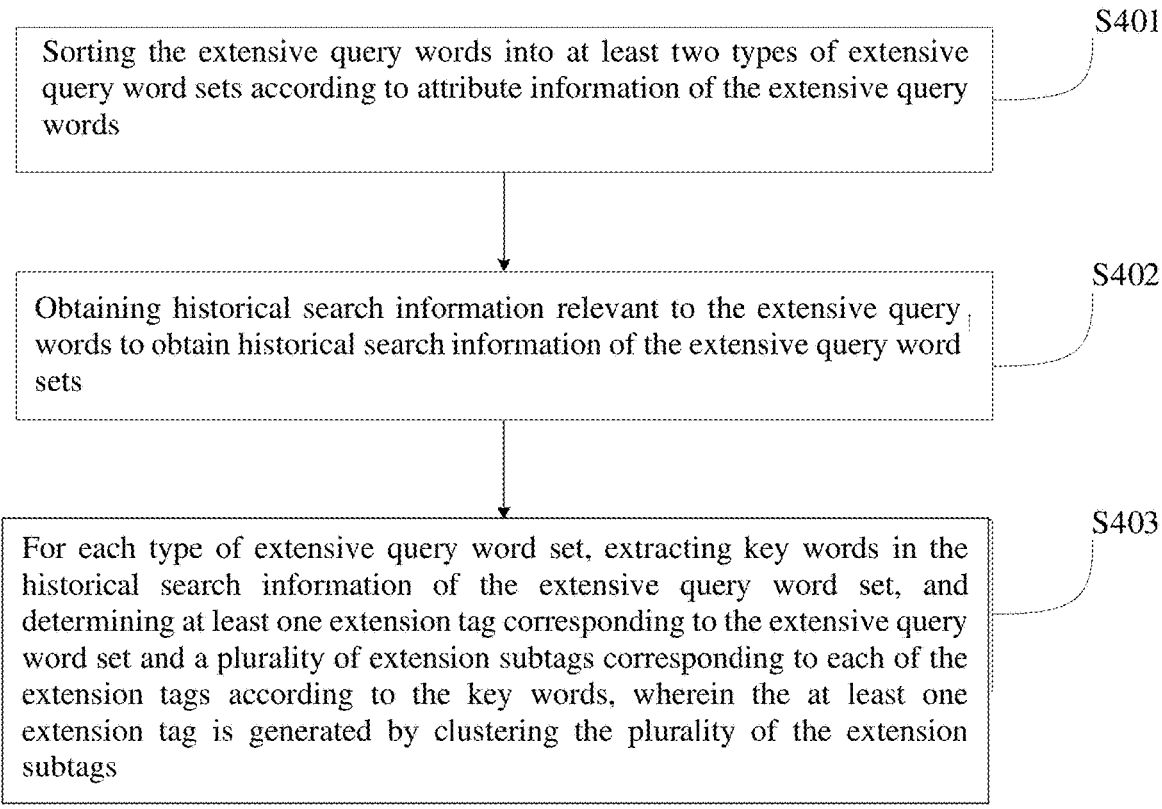
FIG. 4 shows a flow diagram of a specific method for determining extension tags corresponding to extensive query word sets in the search method provided in Embodiment 2 of the present disclosure.

Next, the above-mentioned process that the extension tags corresponding to the extensive query word sets and the extension subtags thereof are determined is specifically described. As shown in FIG. 4, the above-mentioned process that the extension tags corresponding to the extensive query word sets and the extension subtags thereof are determined specifically includes the following steps:

S401, the extensive query words are sorted into at least two types of extensive query word sets according to attribute information of the extensive query words;

S402, historical search information relevant to the extensive query words is obtained to obtain historical search information of the extensive query word sets; and S403, for each type of extensive query word set, key words in the historical search information of the extensive query word set are extracted, and at least one extension tag corresponding to the extensive query word set and a plurality of extension subtags corresponding to each of the extension tags are determined according to the key words, wherein the at least one extension tag is generated by clustering the plurality of the extension subtags.

In the embodiment of the present disclosure, the extensive query words may be clustered based on the attribute information of the extensive query words, that is, extensive query words with the same attribute information may be clustered to be a same type. Then, for each type of extensive query word set after clustering, an extension tag matched with suck type of extensive query word set and extension subtags thereof are concluded based on the historical search information corresponding to the extensive query word set.

For example, when a city name is used as an extensive query word, attribute information of the city name may include at least one of the number of scenic spots in the city, travel hotness, search frequency and the like.

Next, the above-mentioned clustering process is exemplarily described by taking city names as extensive query words and the number of scenic spots in cities as attribute information.

According to the different numbers of the scenic spots in the cities indicated by the city names (for example, there are hundreds of scenic spots in some areas, but there are only several scenic spots in some areas), these city names may be sorted into several extensive query word sets based on the number of the scenic spots. For example, city names having 1-49 scenic spots may be sorted as a first type of extensive query word set, city names having 50-100 scenic spots may be sorted as a second type of extensive query word set, city names having 101-150 scenic spots may be sorted as a third type of extensive query word set, the city names having 151 or more scenic spots may be sorted as a fourth type of extensive query word set, and thus, the number of categories of the corresponding extensive query word sets is 4.

After sorting, a universal extension tag and corresponding extension subtags thereof may be determined for each type of extensive query word set. Specifically, the key words in the historical search information of the extensive query word set may be extracted, and the key words may be all search words or part of the search words in the historical search information. For example, when the extensive query word set is the first type of extensive query word set, a XX city having 1-49 scenic spots, the key words in the corresponding historical search information may include a XX food guide, a XX scenery and the like.

In a specific application, for facilitating determining a universal tag corresponding to the extensive query word set, after the key words corresponding to the extensive query word set are determined, the corresponding universal tag may be determined based on an analysis result such as the coincidence degree and search frequency of the key words, and the like. For example, key words which are greatest in search frequency and highest in coincidence degree in a type of extensive query word set may be selected as extension subtags, and then, the corresponding extension tag may be obtained based on a clustering result of the extension subtags.

Next, the above-mentioned process that the extension subtags are determined is exemplarily described with 4 query words as an example. For example, the 4 query words are respectively AA, BB, CC and DD respectively corresponding to 15 scenic spots, 35 scenic spots, 58 scenic spots and 98 scenic spots, at the moment, the corresponding extensive query word sets may be determined in the above-mentioned interval division manner, and it is determined that AA and BB belong to the first type of extensive query word set, and CC and DD belong to the second type of extensive query word set.

For a certain type of extensive query word set, if historical search information corresponding to the extensive query word "AA" in the extensive query word set includes "AA travel guide", "AA food guide", "AA scenery", "AA instagram-worthy location", "AA beer and skittles", "AA food recommendation" and the like, and historical search information corresponding to the extensive query word "BB" includes "BB travel guide", "BB food guide" and the like, here, "travel guide", "food guide", "scenery", "food", "food recommendation", "instagram-worthy location", "beer and skittles" and the like may be used as the key words of such type of extensive query word set.

In view of the higher search frequency and the higher coincidence degree of the key words, namely the "travel guide" and the "food guide", in one extensive query word set, the "travel guide" and the "food guide" may be used as extension subtags of the extensive query word set where AA and BB are located.

Further, for one type of extensive query word set, the extension subtags corresponding to the extensive query word set may be clustered to obtain a corresponding extension tag. For example, under the condition that the "travel guide" and the "food guide" are used as the extension subtags of one type of extensive query word set, "guide" may be used as the corresponding extension tag.

In the embodiment of the present disclosure, after the at least one extension tag corresponding to the extensive query word sets and the plurality of the extension subtags corresponding to each of the extension tags are determined, the above-mentioned corresponding relationship may be stored in a preset database. In this way, after the extensive query words are extracted from the extensive query search request, the extensive query word sets in the preset database may be traversed, and at least one extension tag corresponding to the extensive query search request and a plurality of extension subtags corresponding to each of the extension tags may be determined based on a traversal result.

Here, if a corresponding extensive query word set is searched, the at least one extension tag corresponding to the searched extensive query word set and the plurality of the extension subtags corresponding to each of the extension tags may be used as the at least one extension tag corresponding to the extensive query search request and the plurality of the extension subtags corresponding to each of the extension tags; and if the above-mentioned extensive query words to be searched do not exist after the extensive query word sets are traversed, the extensive query word set corresponding to the extensive query words may be determined based on the attribute information of the extensive query words, at the moment, the at least one extension tag corresponding to the determined extensive query word set and the plurality of the extension subtags corresponding to each of the extension tags are used as the at least one extension tag corresponding to the extensive query search request and the plurality of the extension subtags corresponding to each of the extension tags.

It needs to be noted that if it is determined that one extensive query word to be searched does not belong to any one of the preset extensive query word sets, at the moment, the extensive query word may be added into the extensive query word set after the extensive query word set corresponding to the extensive query word is determined based on attribute information of the extensive query word, and thus, the updating of the set is achieved.

Second: the corresponding extension tag and extension subtags may be directly determined based on the extensive query words.

In the embodiment of the present disclosure, in addition to that the extension tag and the extension subtags may be determined based on the above-mentioned clustered extensive query word sets, instead of clustering according to dimensional analysis of the sets, historical query words are directly analyzed in advance to determine the corresponding extension tag and extension subtags. Similarly, the key words in the historical search information of each of the extensive query words may be specifically extracted, and at least one extension tag corresponding to the extensive query word and a plurality of extension subtags corresponding to each of the extension tags may be determined according to the extracted key words.

For example, the historical search information corresponding to the extensive query word "AA" includes "AA travel guide", "AA food guide", "AA scenery", "AA instagram-worthy location", "AA beer and skittles", "AA food recommendation" and the like, wherein "travel guide" and "food guide" which are used as the key words are higher in search frequency and coincidence degree of key words in the historical search information corresponding to the extensive query word "AA", and therefore, the "AA travel guide" and the "AA food guide" may be used as the extension subtags of the extensive query word "AA".

After the extension tag and the corresponding extension subtags are determined by using the search method provided in the embodiment of the present disclosure, the multimedia content card corresponding to the extension tag may be determined based on the multimedia content sets corresponding to the extension subtags of one extension tag. Because the multimedia content card may be formed by aggregation from search dimensions corresponding to the extension subtags, search intentions of users may be mined to a certain extent, in this way, a process that a user searches a content may be directly achieved by a triggering operation for the multimedia content sets included in the multimedia content cards, so that a search path is shortened, and the search efficiency is increased.

Figure 5:
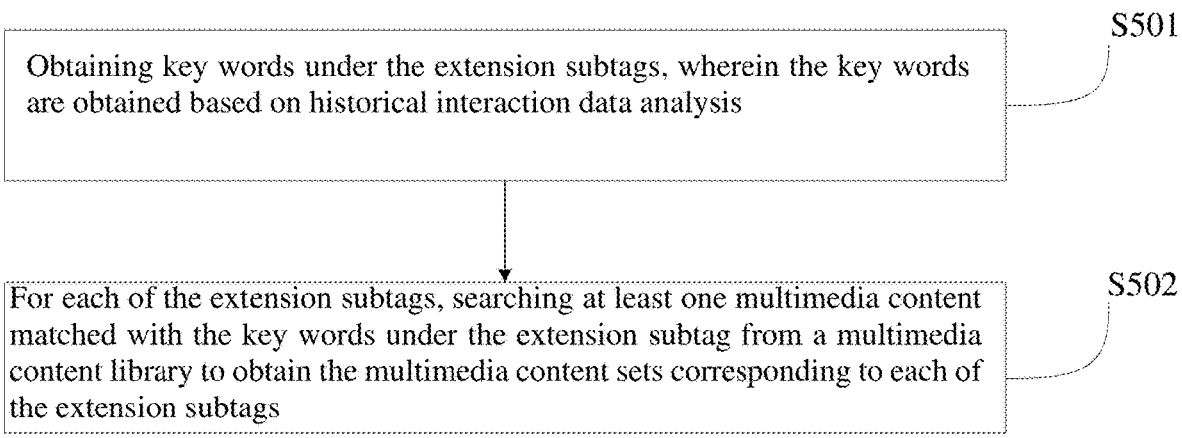
FIG. 5 shows a flow diagram of a specific method for determining multimedia content sets in the search method provided in Embodiment 2 of the present disclosure.

In the above-mentioned S303, the process that the multimedia content sets corresponding to the extension subtags are recalled for each of the extension tags is described with reference to FIG. 5 and may mainly include the following steps:

S501, key words under the extension subtags are obtained, wherein the key words are obtained based on historical interaction data analysis; and S502, for each of the extension subtags, at least one multimedia content matched with the key words under the extension subtag is searched from a multimedia content library to obtain the multimedia content sets corresponding to each of the extension subtags.

Here, after each of the extension subtags is obtained, the key words corresponding to the extension subtags are extracted based on historical interaction data, and then, search is initiated in the multimedia content library based on the extracted key words to find the multimedia contents matched with the key words. The historical interaction data described herein may be relevant search data adopted in a process that a user searches the extensive query words indicated by the extension subtags, for example, some corresponding search words with higher search frequencies may be used as the key words under the extension subtags. When the multimedia contents matched with the key words are searched, medium contents with a higher matching degree may be selected as target multimedia contents in the multimedia content sets corresponding to the extension subtags by calculating matching degrees between the key words and the multimedia contents (such as calculating the similarity between respective corresponding feature vectors).

In the embodiment of the present disclosure, considering that in the process of determining the multimedia content sets for the extension subtags, the multimedia content sets may be determined based on the key words under the extension subtags, that is, the accuracy of the key words directly affects the real-time property of the recalled multimedia contents and the relevance of the intentions of the user. Therefore, the embodiment of the present disclosure further provides a solution for updating the extension subtags, which may be specifically achieved by the following steps:

step 1, historical search statements are obtained;

step 2, the historical search statements are analyzed and clustered to obtain candidate words corresponding to the extension tags; and step 3, the plurality of the extension subtags corresponding to the extension tags are updated based on the candidate words.

Here, firstly, the historical search statements (including search words) of user terminals may be obtained, the candidate words corresponding to the extension tags may be determined by analyzing and clustering the historical search statements, in this way, the plurality of the extension subtags corresponding to the extension tags may be updated based on the candidate words.

In a specific application, the historical search statements may be firstly segmented to obtain a plurality of key words, and then, these key words are clustered to obtain the candidate words under the extension tags, at the moment, the candidate words are matched with the extension subtags so as to be optimized.

In the embodiment of the present disclosure, for facilitating presenting the multimedia content sets included in the multimedia content cards on the user terminal, the cover images and the text description contents thereof of the multimedia content sets may also be determined. Descriptions are respectively performed in the following two aspects.

In a first aspect, the cover images for the multimedia content sets may be determined based on analysis on the multimedia content sets.

Here, a plurality of key frame images may be firstly extracted from the multimedia contents included in the multimedia content sets, then, the key frame images are screened, and thus, the cover images of the multimedia content sets are obtained.

Next, the process that the plurality of the key frame images are extracted is specifically described with an example in which videos are used as the multimedia contents. For example, for one multimedia content set including 5 short videos, the 5 short videos may be respectively analyzed, a video key frame (such as a similar video frame with higher occurrence frequency) corresponding to each of the short videos is screened, and the screened video key frames may be used as the key frame images.

For each of the screened key frame images, the semantic meaning of the key frame image may be firstly extracted, a vector of the semantic meaning is determined, a matching degree (the higher the similarity is, the higher the corresponding matching degree is) between each key frame image and each extension subtag may be determined by calculating the similarity between the vector of the semantic meaning and a vector of a key word under the extension subtag, here, a key frame image with a highest matching degree with the extension subtag may be selected as the cover image, and thus, it is most possible to represent relevant information of the overall multimedia content set.

In a second aspect, the text description contents for the multimedia content sets may be determined based on analysis on the multimedia content sets.

Here, description information corresponding to the multimedia contents included in the multimedia content sets may be firstly determined, then, the description information is screened, and thus, the text description contents of the multimedia content sets are obtained.

The above-mentioned description information for the multimedia contents may represent subject contents of the multimedia contents, such a piece of information may be added when a user issues the corresponding multimedia contents or extracted from the multimedia contents based on a semantic meaning extraction technology. In a specific application, the above-mentioned description information may be in a form of a subject word or a subject sentence.

Here, by taking the condition that the subject word is used as the description information as an example, for the determined description information, a matching degree (the higher the similarity is, the higher the corresponding matching degree is) between each key frame image and each extension subtag may be determined by calculating the similarity between a vector of the subject word and a vector of a key word under the extension subtag, here, a subject word with a highest matching degree with the extension subtag may be selected as the text description information, and thus, it is most possible to represent relevant information of the overall multimedia content set.

Specific display manners of the cover images and the text description contents may refer to FIG. 2 (a) and the relevant description thereof in Embodiment 1 of the present disclosure, which are omitted herein.

It may be understood by those skilled in the art that, in the above-mentioned method in a specific implementation, a composing order of the steps does not mean a strict performing order to constitute any limitations to an implementation process, and a specific performing order of the steps should be determined based on a function and a possible internal logic.

Based on the same inventive concept, an embodiment of the present disclosure further provides a search device corresponding to the search method. A problem solving principle of the device in the embodiment of the present disclosure is similar to that of the above-mentioned search method in the embodiment of the present disclosure, and therefore, the implementation of the device may refer to that of the method, and the repetitive descriptions thereof are emitted herein.

Embodiment 3

Figure 6:
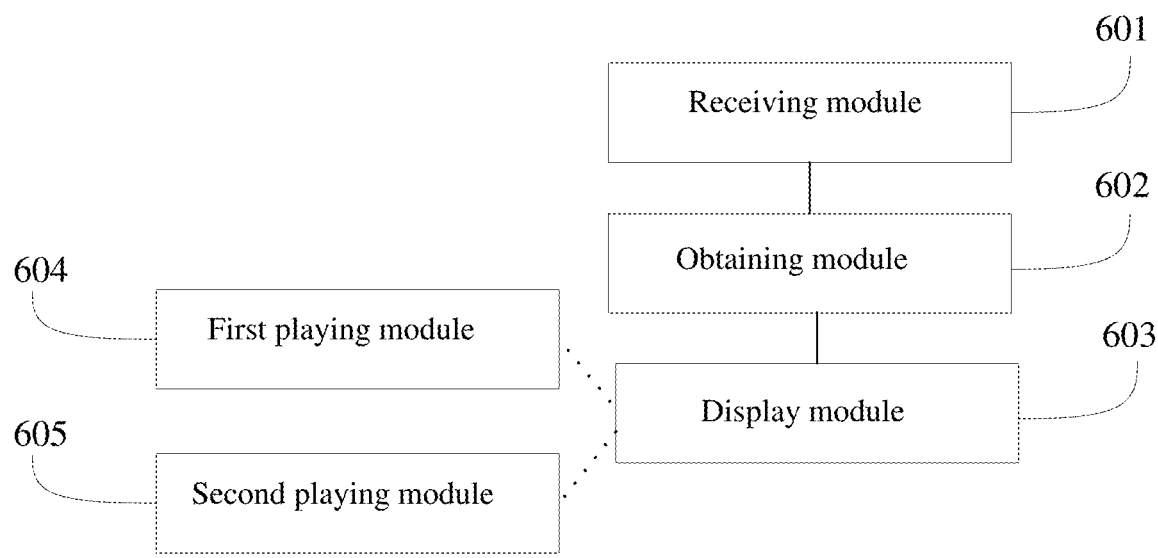
FIG. 6 shows a schematic diagram of a search device provided in Embodiment 3 of the present disclosure.

With reference to FIG. 6 which shows a schematic diagram of a search device provided in Embodiment 3 of the present disclosure, the device includes:

a receiving module 601, configured to receive an extensive query search request, the extensive query search request carrying extensive query words;

an obtaining module 602, configured to obtain at least one multimedia content card corresponding to the extensive query words, wherein each of the multimedia content cards corresponds to an extension tag corresponding to the extensive query search request, each of the multimedia content cards includes information of a plurality of multimedia content sets, and each of the multimedia content sets corresponds to an extension subtag corresponding to the extension tag; and a display module 603, configured to display the information of the plurality of the multimedia content sets included in each of the multimedia content cards in the at least one multimedia content card.

By adopting the above-mentioned search device, various search intentions of a user for the above-mentioned extensive query words may be met based on the display for the multimedia content sets, that is, search results relevant to the extensive query words may be clustered and displayed from various dimensions, and the user may directly find contents relevant to the search intentions of the user, so that the search efficiency is increased, and a search path is shortened.

In one implementation, the display module 603 is configured to display the plurality of the multimedia content sets included in each of the multimedia content cards according to the following steps:

cover images and text description contents of the multimedia content sets included in the multimedia content card are respectively displayed on display locations corresponding to the multimedia content card, wherein the cover images and the text description contents are determined based on the multimedia content sets.

In one implementation, the above-mentioned device further includes:

a first playing module 604, configured to, in response to a triggering operation for any one of the multimedia content sets, play a multimedia content included in the multimedia content set in a form of a multimedia content stream.

In one implementation, the above-mentioned device further includes:

a second playing module 605, configured to, in response to playing completion of the multimedia content included in the multimedia content set, continuously play multimedia contents included in other multimedia content sets in the form of the multimedia content stream, wherein the multimedia content set and the other multimedia content sets belong to a same multimedia content card.

Figure 7:
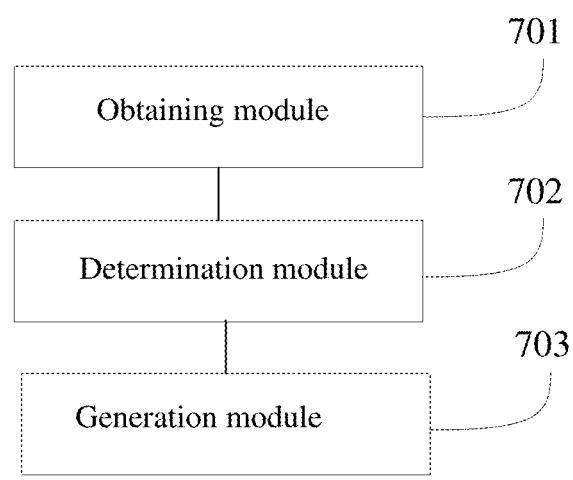
FIG. 7 shows a schematic diagram of another search device provided in Embodiment 3 of the present disclosure.

As shown in FIG. 7 which shows a schematic diagram of another search device provided in Embodiment 3 of the present disclosure, the device includes:

an obtaining module 701, configured to obtain an extensive query search request, the extensive query search request carrying extensive query words;

a determination module 702, configured to determine at least one extension tag corresponding to the extensive query search request and a plurality of extension subtags corresponding to each of the extension tags according to the extensive query words; and a generation module 703, configured to, for each of the extension tags, obtain multimedia content sets corresponding to the extension subtags, and generate multimedia content cards corresponding to the extension tag according to the multimedia content sets; and obtain at least one multimedia content card corresponding to the extensive query words based on the multimedia content cards corresponding to the at least one extension tag.

In one implementation, the above-mentioned device further includes:

a sorting module, configured to sort the extensive query words into at least two types of extensive query word sets according to attribute information of the extensive query words; obtain historical search information relevant to the extensive query words to obtain historical search information of the extensive query word sets; and for each type of extensive query word set, extract key words in the historical search information of the extensive query word set, and determine at least one extension tag corresponding to the extensive query word set and a plurality of extension subtags corresponding to each of the extension tags according to the key words, wherein the at least one extension tag is generated by clustering the plurality of the extension subtags.

In one implementation, the determination module 702 is configured to determine the at least one extension tag corresponding to the extensive query search request and the plurality of the extension subtags corresponding to each of the extension tags according to the extensive query words by using the following steps:

the extensive query word sets including the extensive query words are determined; and at least one extension tag corresponding to the extensive query word sets and the plurality of the extension subtags corresponding to each of the extension tags are used as the at least one extension tag corresponding to the extensive query search request and the plurality of the extension subtags corresponding to each of the extension tags.

In one implementation, the determination module 702 is configured to determine the at least one extension tag corresponding to the extensive query search request and the plurality of the extension subtags corresponding to each of the extension tags according to the extensive query words by using the following steps:

if the extensive query words do not exist in any one of the extensive query word sets, extensive query word sets corresponding to the extensive query words are determined based on the attribute information of the extensive query words; and at least one extension tag corresponding to the extensive query word sets and the plurality of the extension subtags corresponding to each of the extension tags are used as the at least one extension tag corresponding to the extensive query search request and the plurality of the extension subtags corresponding to each of the extension tags.

In one implementation, the above-mentioned device further includes:

an updating module, configured to obtain historical search statements; analyze and cluster the historical search statements to obtain candidate words corresponding to the extension tags; and update the plurality of the extension subtags corresponding to the extension tags based on the candidate words.

In one implementation, the generation module 703 is configured to determine the multimedia content sets corresponding to each of the extension subtags according to the following steps:

the key words under the extension subtags are obtained, wherein the key words are obtained based on historical interaction data analysis; and for each of the extension subtags, at least one multimedia content matched with the key words under the extension subtag is searched from a multimedia content library to obtain the multimedia content sets corresponding to each of the extension subtags.

In one implementation, the above-mentioned device further includes:

a first search module, configured to, for each multimedia content set included in each multimedia content card, extract at least one key frame image from at least one multimedia content included in the multimedia content set, and search a key frame image with a maximum matching degree from the at least one key frame image as a cover image of the multimedia content set based on a matching degree between the at least one extracted key frame image and each of the extension subtags corresponding to the multimedia content set.

In one implementation, the above-mentioned device further includes:

a second search module, configured to, for each multimedia content set included in each multimedia content card, obtain description information of at least one multimedia content included in the multimedia content set, and search description information with a maximum matching degree from the at least one piece of description information as a text description content of the multimedia content set based on a matching degree between the at least one piece of obtained description information and each of the extension subtags corresponding to the multimedia content set.

The description for the processing processes of the modules in the device and a process for interaction among the modules may refer to the relevant descriptions in the above-mentioned method embodiments, which is omitted herein.

Embodiment 4

Figure 8:
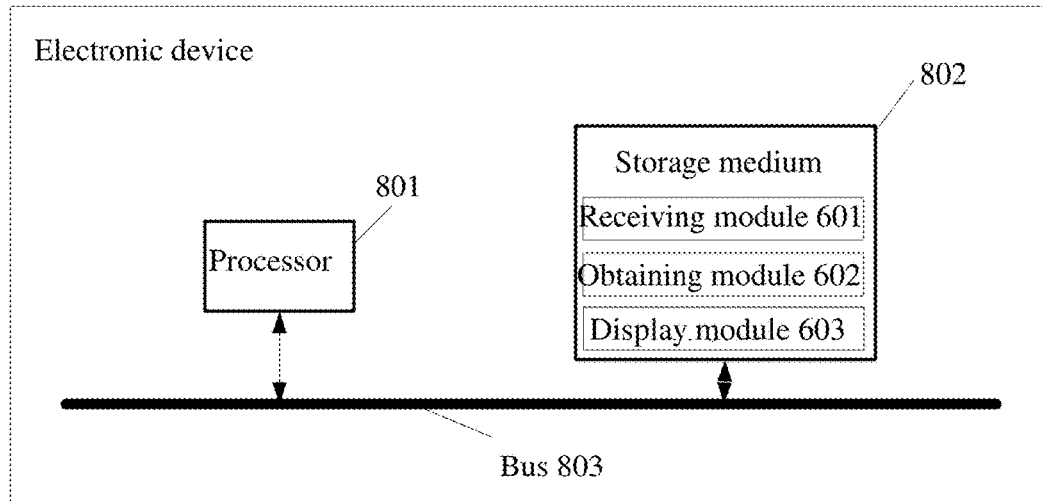
FIG. 8 shows a schematic diagram of electronic device provided in Embodiment 4 of the present disclosure.

An embodiment of the present disclosure further provides electronic device which may be a server or a user terminal. When the user terminal is used as the electronic device, as shown in FIG. 8 which shows a schematic structural diagram of electronic device provided in the embodiment of the present disclosure, the electronic device includes a processor 801, a memory 802 and a bus 803. The memory 802 stores a machine readable instruction (such as instructions correspondingly executed by the receiving module 601, the obtaining module 602 and the display module 603 in the search device as shown in FIG. 6) that can be executed by the processor 801. When the electronic device operates, the processor 801 communicates with the memory 802 by the bus 803, and when the machine readable instruction is executed by the processor 801, the following processes are performed:

an extensive query search request is received, the extensive query search request carrying extensive query words;

at least one multimedia content card corresponding to the extensive query words is obtained, wherein each of the multimedia content cards corresponds to an extension tag corresponding to the extensive query search request, each of the multimedia content cards includes information of a plurality of multimedia content sets, and each of the multimedia content sets corresponds to an extension subtag corresponding to the extension tag; and the information of the plurality of the multimedia content sets included in each of the multimedia content cards in the at least one multimedia content card is displayed.

In one implementation, in the above-mentioned instruction executed by the processor 801, the step that the information of the plurality of the multimedia content sets included in each of the multimedia content cards is displayed includes:

cover images and text description contents of the multimedia content sets included in the multimedia content card are respectively displayed on display locations corresponding to the multimedia content card, wherein the cover images and the text description contents are determined based on the multimedia content sets.

In one implementation, the above-mentioned instruction executed by the processor 801 further includes:

in response to a triggering operation for any one of the multimedia content sets, a multimedia content included in the multimedia content set is played in a form of a multimedia content stream.

In one implementation, the above-mentioned instruction executed by the processor 801 further includes:

in response to playing completion of the multimedia content included in the multimedia content set, multimedia contents included in other multimedia content sets are continuously played in the form of the multimedia content stream, wherein the multimedia content set and the other multimedia content sets belong to a same multimedia content card.

Figure 9:
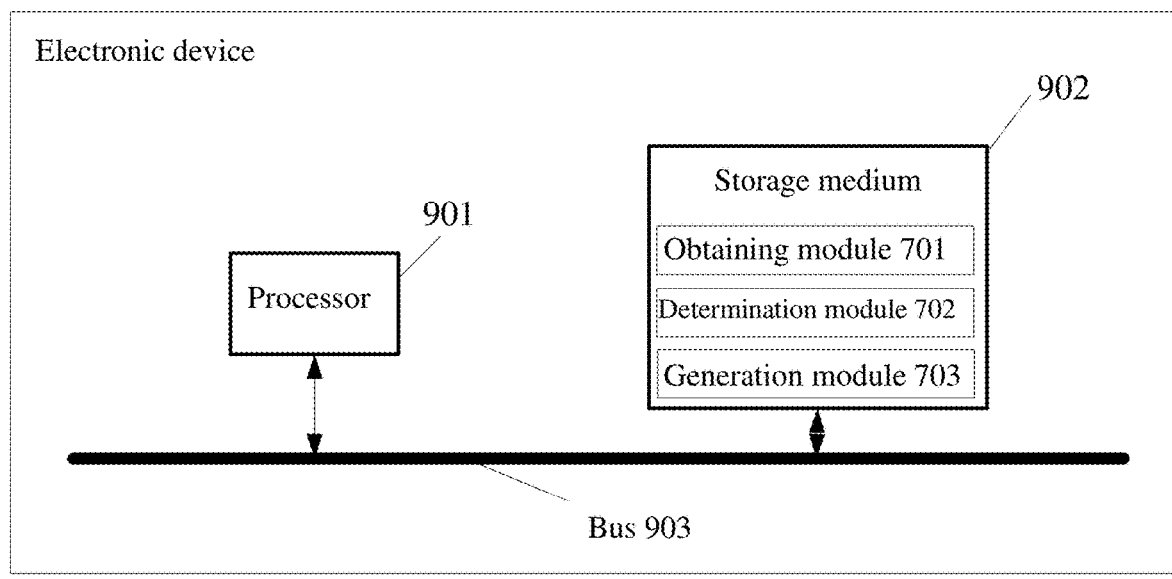
FIG. 9 shows a schematic diagram of another electronic device provided in Embodiment 4 of the present disclosure.

When the server is used as the electronic device, as shown in FIG. 9 which shows a schematic structural diagram of electronic device provided in the embodiment of the present disclosure, the electronic device includes a processor 901, a memory 902 and a bus 903. The memory 902 stores a machine readable instruction (such as instructions correspondingly executed by the obtaining module 701, the determination module 702 and the generation module 703 in the search device as shown in FIG. 7) that can be executed by the processor 901. When the electronic device operates, the processor 901 communicates with the memory 902 by the bus 903, and when the machine readable instruction is executed by the processor 901, the following processes are performed:

an extensive query search request is obtained, the extensive query search request carrying extensive query words;

at least one extension tag corresponding to the extensive query search request and a plurality of extension subtags corresponding to each of the extension tags are determined according to the extensive query words;

for each of the extension tags, multimedia content sets corresponding to the extension subtags are obtained, and multimedia content cards corresponding to the extension tag are generated according to the multimedia content sets; and at least one multimedia content card corresponding to the extensive query words is obtained based on the multimedia content cards corresponding to the at least one extension tag.

In one implementation, the above-mentioned instruction executed by the processor 901 further includes:

the extensive query words are sorted into at least two types of extensive query word sets according to attribute information of the extensive query words;

historical search information relevant to the extensive query words is obtained to obtain historical search information of the extensive query word sets; and for each type of extensive query word set, key words in the historical search information of the extensive query word set are extracted, and at least one extension tag corresponding to the extensive query word set and a plurality of extension subtags corresponding to each of the extension tags are determined according to the key words, wherein the at least one extension tag is generated by clustering the plurality of the extension subtags.

In one implementation, in the above-mentioned instruction executed by the processor 901, the step that at least one extension tag corresponding to the extensive query search request and a plurality of extension subtags corresponding to each of the extension tags are determined according to the extensive query words includes:

the extensive query word sets including the extensive query words are determined; and at least one extension tag corresponding to the extensive query word sets and the plurality of the extension subtags corresponding to each of the extension tags are used as the at least one extension tag corresponding to the extensive query search request and the plurality of the extension subtags corresponding to each of the extension tags.

In one implementation, in the above-mentioned instruction executed by the processor 901, the step that at least one extension tag corresponding to the extensive query search request and a plurality of extension subtags corresponding to each of the extension tags are determined according to the extensive query words includes:

if the extensive query words do not exist in any one of the extensive query word sets, extensive query word sets corresponding to the extensive query words are determined based on the attribute information of the extensive query words; and at least one extension tag corresponding to the extensive query word sets and the plurality of the extension subtags corresponding to each of the extension tags are used as the at least one extension tag corresponding to the extensive query search request and the plurality of the extension subtags corresponding to each of the extension tags.

In one implementation, the above-mentioned instruction executed by the processor 901 further includes:

historical search statements are obtained;

the historical search statements are analyzed and clustered to obtain candidate words corresponding to the extension tags; and the plurality of the extension subtags corresponding to the extension tags are updated based on the candidate words.

In one implementation, in the above-mentioned instruction executed by the processor 901, the multimedia content sets corresponding to each of the extension subtags are determined according to the following steps:

the key words under the extension subtags are obtained, wherein the key words are obtained based on historical interaction data analysis; and for each of the extension subtags, at least one multimedia content matched with the key words under the extension subtag is searched from a multimedia content library to obtain the multimedia content sets corresponding to each of the extension subtags.

In one implementation, the above-mentioned instruction executed by the processor 901 further includes:

for each multimedia content set included in each multimedia content card, at least one key frame image is extracted from at least one multimedia content included in the multimedia content set, and a key frame image with a maximum matching degree is searched from the at least one key frame image as a cover image of the multimedia content set based on a matching degree between the at least one extracted key frame image and each of the extension subtags corresponding to the multimedia content set.

In one implementation, the above-mentioned instruction executed by the processor 901 further includes:

for each multimedia content set included in each multimedia content card, description information of at least one multimedia content included in the multimedia content set is obtained, and description information with a maximum matching degree is searched from the at least one piece of description information as a text description content of the multimedia content set based on a matching degree between the at least one piece of obtained description information and each of the extension subtags corresponding to the multimedia content set.

An embodiment of the present disclosure further provides a computer readable storage medium, wherein the computer readable storage medium stores a computer program, and when the computer program is executed by a processor, the steps of the search methods in the above-mentioned method embodiments 1 and 2 are performed. The storage medium may be a volatile or non-volatile computer readable storage medium.

The computer program product of the search method provided by the embodiment of the present disclosure includes a computer-readable storage medium that stores program code, and the instructions included in the program code can be used to perform the steps of the search method described in the above method embodiment. For details, please refer to the above method embodiment and will not be repeated here.

The embodiment of the present disclosure also provides a computer program, which is executed by a processor to implement any method of the foregoing embodiment. The computer program product can be implemented by hardware, software or a combination thereof. In an optional embodiment, the computer program product is embodied as a computer storage medium, and in another optional embodiment, the computer program product is embodied as a software product, such as a software development kit (SDK) and so on.

Those skilled in the art can clearly understand that for the convenience and simplicity of the description, the specific process flow of the system and device described above can refer to the corresponding process in the above method embodiment, and will not be repeated here. In the several embodiments provided by the present disclosure, it should be understood that the disclosed systems, devices and methods can be implemented in other ways. The device embodiments described above are only schematic. For example, the division of the unit is only a logical function division, and there may be another division method in actual implementation. For example, multiple units or components may be combined or integrated into another system, or some features may be ignored or not executed. On the other hand, the mutual coupling or direct coupling or communication connection shown or discussed can be indirect coupling or communication connection through some communication interfaces, devices or units, and can be electrical, mechanical or other forms.

The unit described as a separate part can be or may not be physically separated, and the part displayed as a unit can be or may not be a physical unit, that is, it can be located in one place, or it can be distributed to multiple network units. Some or all of the units can be selected according to actual needs to achieve the purpose of this embodiment.

In addition, the functional units in various embodiments of the present disclosure can be integrated into one processing unit, or each unit can exist separately, or two or more units can be integrated into one unit.

If the functions are realized in the form of software function units and sold or used as independent products, they can be stored in a non-volatile computer readable storage medium executable by the processor. Based on this understanding, the technical solution of the present disclosure, in essence, or the part that contributes to the existing technology or the part of the technical solution, can be embodied in the form of a software product, which is stored in a storage medium, including several instructions to enable an electronic device (which can be a personal computer, a server, or a network device, etc.) to perform all or part of the steps of the method described in various embodiments of the present disclosure. The aforementioned storage media include USB flash disk, mobile hard disk, read only memory (ROM), random access memory (RAM), magnetic disc or optical disc and other media that can store program codes.

Finally, it should be noted that the above-mentioned embodiments are only specific embodiments of the present disclosure, which are used to illustrate the technical solution of the present disclosure rather than limit it. The scope of protection of the present disclosure is not limited to this. Although the present disclosure is described in detail with reference to the above-mentioned embodiments, ordinary technicians in the art should understand that any person skilled in the art can still modify or easily make changes to the technical solution recited in the above embodiments, or make equivalent replacement to some of the technical features without depart from the technical scope of the present disclosure; these modifications, changes or replacements do not make the essence of the corresponding technical solution separate from the spirit and scope of the technical solution of the embodiments of the present disclosure, and should be covered by the scope of protection of the present disclosure. Therefore, the scope of protection of the present disclosure should be subject to the scope of protection of the claims.

What is claimed is:

1. A search method, wherein the method comprises:
   receiving an extensive query search request, the extensive query search request carrying extensive query words;
   obtaining at least one multimedia content card corresponding to the extensive query words, wherein each of the multimedia content cards corresponds to an extension tag corresponding to the extensive query search request, each of the multimedia content cards comprises information of a plurality of multimedia content sets, and each of the multimedia content sets corresponds to an extension subtag corresponding to the extension tag; and
   displaying the information of the plurality of the multimedia content sets included in each of the multimedia content cards in the at least one multimedia content card,
   wherein displaying the information of the plurality of the multimedia content sets included in each of the multimedia content cards comprises:
   respectively displaying cover images and text description contents of the multimedia content sets included in the multimedia content card on display locations corresponding to the multimedia content card, wherein the cover images and the text description contents are determined based on the multimedia content sets.

2. The search method of claim 1, wherein the method further comprises:
   playing a multimedia content included in the multimedia content set in a form of a multimedia content stream, in response to a triggering operation for any one of the multimedia content sets.

3. The search method of claim 1, wherein the method further comprises: playing a multimedia content included in the multimedia content set in a form of a multimedia content stream, in response to a triggering operation for any one of the multimedia content sets.

4. The search method of claim 2, wherein the method further comprises:
   continuously playing multimedia contents included in other multimedia content sets in the form of the multimedia content stream, in response to playing completion of the multimedia content included in the multimedia content set, wherein the multimedia content set and the other multimedia content sets belong to a same multimedia content card.

5. A search method, wherein the method comprises:
   obtaining an extensive query search request, the extensive query search request carrying extensive query words;
   determining at least one extension tag corresponding to the extensive query search request and a plurality of extension subtags corresponding to each of the extension tags according to the extensive query words;
   for each of the extension tags, obtaining multimedia content sets corresponding to the extension subtags, and generating multimedia content cards corresponding to the extension tag according to the multimedia content sets;
   obtaining at least one multimedia content card corresponding to the extensive query words based on the multimedia content cards corresponding to the at least one extension tag; and
   for each multimedia content set included in each multimedia content card, extracting at least one key frame image from at least one multimedia content included in the multimedia content set, and searching a key frame image with a maximum matching degree from the at least one key frame image as a cover image of the multimedia content set based on a matching degree between the at least one extracted key frame image and each of the extension subtags corresponding to the multimedia content set.

6. The search method of claim 5, wherein the method further comprises:
   sorting the extensive query words into at least two types of extensive query word sets according to attribute information of the extensive query words;
   obtaining historical search information relevant to the extensive query words to obtain historical search information of the extensive query word sets; and
   for each type of extensive query word set, extracting key words in the historical search information of the extensive query word set, and determining at least one extension tag corresponding to the extensive query word set and a plurality of extension subtags corresponding to each of the extension tags according to the key words, wherein the at least one extension tag is generated by clustering the plurality of the extension subtags.

7. The search method of claim 6, wherein determining at least one extension tag corresponding to the extensive query search request and a plurality of extension subtags corresponding to each of the extension tags according to the extensive query words comprises:
   determining the extensive query word sets including the extensive query words; and
   using at least one extension tag corresponding to the extensive query word sets and the plurality of the extension subtags corresponding to each of the extension tags as the at least one extension tag corresponding to the extensive query search request and the plurality of the extension subtags corresponding to each of the extension tags.

8. The search method of claim 6, wherein determining at least one extension tag corresponding to the extensive query search request and a plurality of extension subtags corresponding to each of the extension tags according to the extensive query words comprises:
   determining extensive query word sets corresponding to the extensive query words based on the attribute information of the extensive query words, in response to determining that the extensive query words do not exist in any one of the extensive query word sets; and
   using at least one extension tag corresponding to the extensive query word sets and the plurality of the extension subtags corresponding to each of the extension tags as the at least one extension tag corresponding to the extensive query search request and the plurality of the extension subtags corresponding to each of the extension tags.

9. The search method of claim 5, wherein the method further comprises:
   obtaining historical search statements;
   analyzing and clustering the historical search statements to obtain candidate words corresponding to the extension tags; and
   updating the plurality of the extension subtags corresponding to the extension tags based on the candidate words.

10. The search method of claim 6, wherein the method further comprises:
    obtaining historical search statements;
    analyzing and clustering the historical search statements to obtain candidate words corresponding to the extension tags; and
    updating the plurality of the extension subtags corresponding to the extension tags based on the candidate words.

11. The search method of claim 7, wherein the method further comprises:
    obtaining historical search statements;
    analyzing and clustering the historical search statements to obtain candidate words corresponding to the extension tags; and
    updating the plurality of the extension subtags corresponding to the extension tags based on the candidate words.

12. The search method of claim 8, wherein the method further comprises:
    obtaining historical search statements;
    analyzing and clustering the historical search statements to obtain candidate words corresponding to the extension tags; and
    updating the plurality of the extension subtags corresponding to the extension tags based on the candidate words.

13. The search method of claim 5, wherein multimedia content sets corresponding to each of the extension subtags are determined according to the following steps:
    obtaining key words under the extension subtags, wherein the key words are obtained based on historical interaction data analysis; and
    for each of the extension subtags, searching at least one multimedia content matched with the key words under the extension subtag from a multimedia content library to obtain the multimedia content sets corresponding to each of the extension subtags.

14. The search method of claim 5, wherein the method further comprises:
    for each multimedia content set included in each multimedia content card, obtaining description information of at least one multimedia content included in the multimedia content set, and searching description information with a maximum matching degree from the at least one piece of description information as a text description content of the multimedia content set based on a matching degree between the at least one piece of obtained description information and each of the extension subtags corresponding to the multimedia content set.

15. A non-transitory computer readable storage medium, wherein a computer program is stored the computer readable storage medium, and when the computer program is executed by a processor, causes the processor to implement a method comprising:
    receiving an extensive query search request, the extensive query search request carrying extensive query words;
    obtaining at least one multimedia content card corresponding to the extensive query words, wherein each of the multimedia content cards corresponds to an extension tag corresponding to the extensive query search request, each of the multimedia content cards comprises information of a plurality of multimedia content sets, and each of the multimedia content sets corresponds to an extension subtag corresponding to the extension tag; and
    displaying the information of the plurality of the multimedia content sets included in each of the multimedia content cards in the at least one multimedia content card,
    wherein displaying the information of the plurality of the multimedia content sets included in each of the multimedia content cards comprises: respectively displaying cover images and text description contents of the multimedia content sets included in the multimedia content card on display locations corresponding to the multimedia content card, wherein the cover images and the text description contents are determined based on the multimedia content sets.

16. The non-transitory computer readable storage medium of claim 15, wherein displaying the information of the plurality of the multimedia content sets included in each of the multimedia content cards comprises:
    respectively displaying cover images and text description contents of the multimedia content sets included in the multimedia content card on display locations corresponding to the multimedia content card, wherein the cover images and the text description contents are determined based on the multimedia content sets.

17. The non-transitory computer readable storage medium of claim 15, wherein the method further comprises:
playing a multimedia content included in the multimedia content set in a form of a multimedia content stream, in response to a triggering operation for any one of the multimedia content sets.

18. The non-transitory computer readable storage medium of claim 17, wherein the method further comprises:
continuously playing multimedia contents included in other multimedia content sets in the form of the multimedia content stream, in response to playing completion of the multimedia content included in the multimedia content set, wherein the multimedia content set and the other multimedia content sets belong to a same multimedia content card.

\* \* \* \* \*